United States Patent
Osterwise et al.

(10) Patent No.: US 10,602,436 B2
(45) Date of Patent: *Mar. 24, 2020

(54) METHOD AND DEVICE FOR MANAGING ACCESS POINT NAME INFORMATION

(71) Applicant: AT&T Mobility II LLC, Atlanta, GA (US)

(72) Inventors: Robert Osterwise, Cumming, GA (US); Inderpreet Singh Ahluwalia, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,592

(22) Filed: Jun. 28, 2019

(65) Prior Publication Data

US 2019/0327668 A1    Oct. 24, 2019

Related U.S. Application Data

(63) Continuation of application No. 16/014,392, filed on Jun. 21, 2018, now Pat. No. 10,383,043, which is a (Continued)

(51) Int. Cl.
*H04W 48/00* (2009.01)
*H04W 48/16* (2009.01)
(Continued)

(52) U.S. Cl.
CPC .......... *H04W 48/16* (2013.01); *H04B 1/3816* (2013.01); *H04W 8/20* (2013.01);
(Continued)

(58) Field of Classification Search
CPC ....... H04W 48/16; H04W 48/20; H04W 8/20; H04W 8/22; H04W 8/186; H04B 1/3816
See application file for complete search history.

(56) References Cited

U.S. PATENT DOCUMENTS

| | | | |
|---|---|---|---|
| 7,324,489 B1 * | 1/2008 | Iyer | ...................... H04W 76/12 |
| | | | 370/338 |
| 8,406,170 B2 | 3/2013 | Rune et al. | |

(Continued)

FOREIGN PATENT DOCUMENTS

| | | |
|---|---|---|
| CN | 101771965 A | 7/2010 |
| JP | 2013529420 | 7/2013 |

(Continued)

OTHER PUBLICATIONS http://www.engadget.com/2010/07/09/how-to-resize-your-sim-and-drink-the-sweet-nectar-of-mobile-fre/, Discloses methods for modifying SIMs and APNs.

(Continued)

*Primary Examiner* — Khai M Nguyen
(74) *Attorney, Agent, or Firm* — Guntin & Gust PLC; Atanu Das

(57) ABSTRACT

Aspects of the subject disclosure may include, for example, storing, in a UICC memory of a communication device, access point name information associated with a plurality of access point names to be selectively utilized by a device processor of the communication device for wireless communications, and providing the device processor with access to the access point name information in the UICC memory to enable the device processor to establish the wireless communications. Other embodiments are disclosed.

20 Claims, 8 Drawing Sheets

Related U.S. Application Data continuation of application No. 15/606,689, filed on May 26, 2017, now Pat. No. 10,034,231, which is a continuation of application No. 15/057,197, filed on Mar. 1, 2016, now Pat. No. 9,699,716.

(51) Int. Cl.
  H04B 1/3816 (2015.01)
  H04W 8/20 (2009.01)
  H04W 8/22 (2009.01)
  *H04W 48/20* (2009.01)
  *H04W 8/18* (2009.01)

(52) U.S. Cl.
  CPC .............. *H04W 8/22* (2013.01); *H04W 8/186* (2013.01); *H04W 48/20* (2013.01)

(56) References Cited

U.S. PATENT DOCUMENTS

| | | |
|---|---|---|
| 8,533,369 B2 | 9/2013 | Chen et al. |
| 8,639,231 B2 | 1/2014 | Pecen et al. |
| 8,695,063 B2 | 4/2014 | Mendahawi et al. |
| 8,805,365 B2 | 8/2014 | Heckman et al. |
| 8,874,077 B2 | 10/2014 | Bergenwall |
| 8,892,144 B2 | 11/2014 | Shaw et al. |
| 8,983,541 B2 | 3/2015 | Cormier et al. |
| 9,106,768 B2 | 8/2015 | Mohammed |
| 9,154,929 B2 | 10/2015 | Cormier |
| 9,226,151 B2 | 12/2015 | Mohammed et al. |
| 9,699,716 B1* | 7/2017 | Osterwise ............ H04B 1/3816 |
| 10,034,231 B2* | 7/2018 | Osterwise ............ H04B 1/3816 |
| 10,383,043 B2* | 8/2019 | Osterwise ............ H04W 48/16 |
| 2003/0002480 A1 | 1/2003 | Giustina et al. |
| 2005/0114680 A1 | 5/2005 | Chinnaswamy et al. |
| 2005/0259673 A1 | 11/2005 | Lu et al. |
| 2006/0068845 A1 | 3/2006 | Muller et al. |
| 2008/0293407 A1 | 11/2008 | Cormier et al. |
| 2009/0245176 A1 | 10/2009 | Balasubramanian et al. |
| 2011/0319133 A1* | 12/2011 | Dong .................... H04W 8/205 |
| | | 455/558 |
| 2012/0036282 A1 | 2/2012 | Chen et al. |
| 2012/0113865 A1 | 5/2012 | Zhao et al. |
| 2013/0121145 A1 | 5/2013 | Draznin et al. |
| 2014/0105199 A1 | 4/2014 | Tian et al. |
| 2014/0302844 A1 | 10/2014 | Shaw et al. |
| 2015/0026758 A1 | 1/2015 | Payyappilly et al. |
| 2015/0036489 A1 | 2/2015 | Rajadurai et al. |
| 2015/0257084 A1 | 9/2015 | Ramprasad et al. |
| 2015/0257122 A1 | 9/2015 | Sen et al. |
| 2015/0280765 A1 | 10/2015 | Lowery |
| 2015/0358898 A1 | 12/2015 | Lair et al. |
| 2015/0359026 A1 | 12/2015 | Iwai et al. |
| 2015/0382286 A1 | 12/2015 | Daoud |
| 2016/0095023 A1 | 3/2016 | Payyappilly et al. |
| 2016/0216878 A1 | 7/2016 | Ramprasad |
| 2016/0302168 A1 | 10/2016 | Keller et al. |
| 2017/0078869 A1 | 3/2017 | Dong |
| 2017/0251426 A1 | 8/2017 | Yadav et al. |
| 2017/0265125 A1 | 9/2017 | Osterwise et al. |
| 2017/0311241 A1 | 10/2017 | Russell et al. |
| 2018/0302850 A1 | 10/2018 | Osterwise et al. |

FOREIGN PATENT DOCUMENTS

| | | |
|---|---|---|
| KR | 20130003361 | 1/2013 |
| WO | 2015082071 | 6/2015 |
| WO | 2015162539 | 10/2015 |

OTHER PUBLICATIONS http://www.cellularabroad.com/chinadataSIMop.php, Discloses procedure for updating APN on cellular phone.

\* cited by examiner

100

| Identifier : '6FD3' | Structure: transparent | Mandatory for USIM APN |
|---|---|---|
| Parent 'ADF_USIM/7F66' | length : x (min 256) | Update activity : low |
| Access Conditions: READ  UPDATE  ADM  INVALIDATE  ADM  REHABILITATE  ADM  RESIZE | | CHV1  ADM |

| Byte | Length | Description | M/O |
|---|---|---|---|
| 1 | 1 | APN Validity Flag | M |
| 2 | 2 | APN Record 1 (contents TLV coded) | O |
| 4 | Y | APN Record 2 (contents TLV coded) | O |
| Y | n | APN Record n (contents TLV coded) | O |
| | 1 | Terminating Flag | O |

FIG. 2

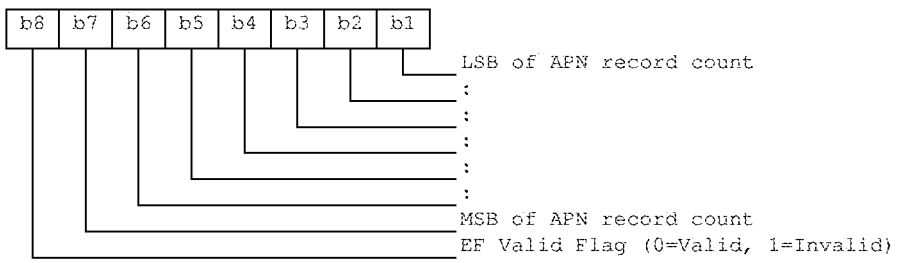

FIG. 3

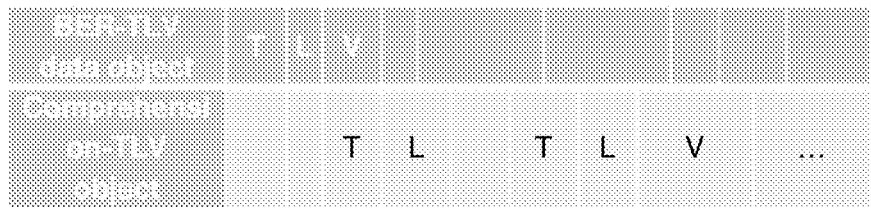

FIG. 4

| Tag | Length (Bytes) | Name | M/O | Comments |
|---|---|---|---|---|
| 80 | 1 | APN Index / Priority | M | Index of APN. 0x01=Highest, 0xFE=lowest In the event of multiple APN records with equal index, read order will take precedence and the ME will increment priority upon import of profile to the next available index. |
| 81 | Variable | APN Name | M | Human readable name of APN |
| 82 | Variable | APN | M | ASCII coded APN in dot form (as appropriate) |
| 83 | 3 | MCC | M | Network Mobile Country Code (ASCII "D" can be substituted as a wild-card) |
| 84 | 3 | MNC | M | Network Mobile Carrier Code (ASCII "D" can be substituted as a wild-card) |
| 85 | 1 | APN on/off | O | Boolean value 1=on, 0=off |
| 86 | Variable | Bearer | O | |
| 87 | Variable | Proxy | O | |
| 88 | Variable | Port | O | |
| 89 | Variable | Username | O | |
| 8A | Variable | Password | O | |
| 8B | Variable | Server | O | |
| 8C | Variable | MMSC | O | |
| 8D | Variable | MultiMedia Message Proxy | O | |
| 8E | Variable | MultiMedia Message Port | O | |
| 8F | Variable | Authentication Type | O | |
| 90 | Variable | APN Type | O | |
| 91 | Variable | APN Protocol | O | |
| 92 | Variable | APN Roaming Profile | O | |
| 93 | Variable | Mobile Virtual Operator type | O | |
| 94 | Variable | MVNO Value | O | |
| 95-FE | TBD | RFU | N/A | |

500
FIG. 5

APN 1:

| APN Index / Priority | 1 |
|---|---|
| APN Name | default |
| APN | default.operator.com |
| MCC | 310 |
| MNC | 876 |
| APN on/off | 1 |

APN 2:

| APN Index / Priority | 2 |
|---|---|
| APN Name | broadband |
| APN | Broadband |
| MCC | 310 |
| MNC | 876 |
| APN on/off | 1 |
| Username | myuser |
| Password | mypass |

APN 3:

| APN Index / Priority | 3 |
|---|---|
| APN Name | Infotainment |
| APN | newapn |
| MCC | 310 |
| MNC | 876 |
| Username | newuser |
| Password | newpass |

FIG. 6

METHOD AND DEVICE FOR MANAGING ACCESS POINT NAME INFORMATION

CROSS-REFERENCE TO RELATED APPLICATION(S)

This application is a continuation of U.S. patent application Ser. No. 16/014,392 filed on Jun. 21, 2018, which is a continuation of U.S. patent application Ser. No. 15/606,689 (now U.S. Pat. No. 10,034,231) filed on May 26, 2017, which is a continuation of U.S. patent application Ser. No. 15/057,197 (now U.S. Pat. No. 9,699,716) filed on Mar. 1, 2016. The contents of each of the foregoing are hereby incorporated by reference into this application as if set forth herein in full.

FIELD OF THE DISCLOSURE

The subject disclosure relates to a method and device for managing access point name information.

BACKGROUND

Communication devices and communication technologies continue to improve and evolve. As these changes occur, devices are often updated in order to be compatible with these changes. As more devices transition to being smart devices that are capable of network communication, the desire for more efficient provisioning of these devices increases.

BRIEF DESCRIPTION OF THE DRAWINGS

Reference will now be made to the accompanying drawings, which are not necessarily drawn to scale, and wherein:

FIG. 2 depicts an illustrative embodiment of a table indicating APN information stored in an Elementary file of a UICC;

FIGS. 3-5 depict illustrative embodiments of bit coding for APN information;

FIG. 6 depicts an illustrative embodiment of APN information that can be stored in a UICC memory;

DETAILED DESCRIPTION

Figure 1:
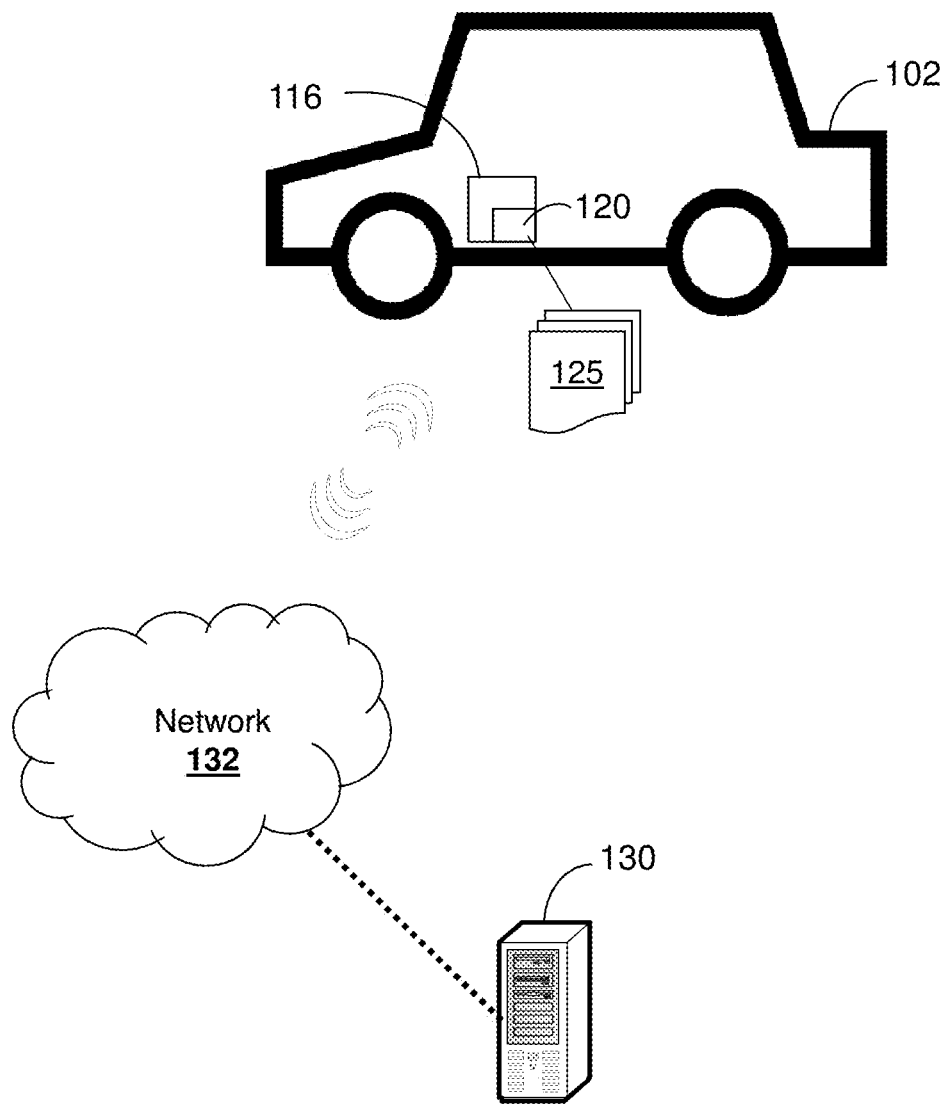
FIG. 1 depicts an illustrative embodiment of a system for managing Access Point Name (APN) information utilizing a Universal Integrated Circuit Card (UICC) of a wireless device.

The subject disclosure describes, among other things, illustrative embodiments for managing the use of APN information via a UICC in a wireless device. A device processor of the wireless device can access the stored APN information, such as during a booting process, and can then utilizing the APN information or a portion thereof for establishing wireless communications. Other embodiments are described in the subject disclosure.

One or more embodiments can include storing APN information on a UICC of a wireless device and enabling Over-the-Air (OTA) provisioning of updates for the APN information. In one or more embodiments, the stored information can be associated with multiple APN's, such as different APN's selected depending on a type of data communication and/or a type of network that the wireless device intends on using. The wireless device can be other than a mobile phone (e.g., car communication systems, Internet of Things devices, Machine-to-Machine (M2M) devices, smart appliances, smart TV's, and so forth) but is also applicable to mobile phones. In one embodiment, APN information can be stored in an Elementary File on a Universal Subscriber Identity Module (USIM) in a wireless device. The wireless device can read this file and extract APN configuration data to populate in the wireless device.

One or more aspects of the subject disclosure include a device having a device processor, a universal integrated circuit card (UICC) coupled with the device processor, and a UICC memory that stores executable instructions that, when executed by the UICC, facilitate performance of operations, including storing, in the UICC memory, access point name information associated with an access point name to be utilized by the device processor for wireless communications. The UICC can receive a wireless provisioning message from a server via the device processor, where the wireless provisioning message includes additional access point name information, where the wireless provisioning message is directed to a group of communication devices including the device, where at least some of the group of communication devices utilize different types of radio access modules, and where the additional access point name information is not configured based on the different types of radio access module. The UICC can update the access point name information based on the additional access point name information to generate an updated access point name information. The UICC can store, in the UICC memory, the updated access point name information.

One or more aspects of the subject disclosure include a method in which a server (including a processor) receives a request for a batch update associated with an access point name, where the batch update is associated with a group of communication devices. The server can generate a wireless provisioning message that includes additional access point name information, where the additional access point name information is independent of a type of radio access module being utilized by each of the group of communication devices. The server can provide, to the group of communication devices, the wireless provisioning message, where the providing of the wireless provisioning message enables the group of communication devices to update access point name information stored in Universal Integrated Circuit Cards of each of the group of communication devices based on the additional access point name information to generate an updated access point name information.

One or more aspects of the subject disclosure include a machine-readable storage medium, including executable instructions that, when executed by a Universal Integrated Circuit Card (UICC) processor of a communication device, facilitate performance of operations, including storing, in a UICC memory of the communication device, access point name information associated with a plurality of access point names to be selectively utilized by a device processor of the communication device for wireless communications. The UICC processor can provide the device processor with access to the access point name information in the UICC memory to enable the device processor to establish the wireless communications.

FIG. 1 depicts an illustrative embodiment of a system 100 for managing APN information 125 utilizing a UICC 120 of a wireless communication device 116 (which is illustrated in this example as being part of a communication system of a vehicle 102). The wireless device 116 can be various types of devices (mobile or fixed) in various environments, including mobile phones, vehicle communication systems, M2M devices, Internet of Things devices, wearable devices, intelligent watches, smart appliances, smart televisions, or any other communication device, such as one that includes a modem or radio access module with the ability to be provisioned with and/or to store APN information in a UICC. In one embodiment, the wireless device 116 can have a limited or no direct user interface (e.g., the device may be limited to receiving user input via a wireless signal and/or via a plug-in interface that is not part of the device).

The UICC 120 can be various types of smart cards (removable or fixed) including USIM, Subscriber Identity Module, eUICC and so forth. In one embodiment, the UICC 120 can be part of a secure services platform of the wireless device 116, as described in U.S. Pat. No. 9,240,989, the disclosure of which is hereby incorporated by reference in its entirety.

The APN information 125 can be associated with one or more APNs that can be utilized for wireless communications by the wireless device 116. As an example, the APN information 125 can include the name of a gateway between a GSM, GPRS, 3G or 4G mobile network and another computer network, such as the public Internet. For instance, the wireless device 116 seeking to establish a data connection can be configured with an APN to present to a carrier. The carrier can then examine the APN identifier to determine what type of network connection should be created, such as which IP addresses should be assigned to the wireless device 116, which security methods should be used, and/or how or if, it should be connected to some private customer network. In one embodiment, the APN information 125 can identify a Packet Data Network (PDN) that a mobile data user wants to communicate with. In this example, the APN information 125 can also be used to define the type of service, (e.g., connection to Wireless Application Protocol (WAP) server, Multimedia Messaging Service (MMS), and so forth) that is provided by the PDN. The APN information 125 can be used in various 3GPP data access networks, such General Packet Radio Service (GPRS) or evolved packet core (EPC).

In one embodiment, the APN information 125 can include a network identifier and/or an operator identifier. For example, the network identifier can define the external network to which the Gateway GPRS Support Node (GGSN) is connected. In another embodiment, the network identifier can also include the service requested by the user. As another example, the operator identifier can define the specific operator's PDN in which the GGSN is located. In another embodiment, the APN information 125 can include a mobile country code (MCC) and/or a mobile network code (MNC), which together can uniquely identify a mobile network operator.

In one embodiment, OTA provisioning can be utilized for providing and/or updating the APN information 125. For example, a server 130 can provide an OTA provisioning message via network 132 to the wireless device 116 so that additional APN information can be received by the UICC 120. The UICC 120 can generate and store updated APN information according to the received additional APN information.

In one embodiment, the server 130 can perform a batch update associated with one or more APN's where the batch update is associated with a group of communication devices (including the wireless device 116). For instance, the server 130 can transmit a wireless provisioning message that includes additional access point name information to the group of communication devices. In one embodiment, the additional access point name information can be independent of (or otherwise not configured based upon) a type of radio access module being utilized by each of the group of communication devices. As such, the same APN information 125 can be provided to different devices that operate utilizing different types of radio access modules (e.g., different radio access modules manufactured by different entities). The transmitting of the wireless provisioning message enables the group of communication devices to update access point name information stored in UICC's of each of the group of communication devices. In one embodiment, the generating of the wireless provisioning message includes providing a mobile country code in the additional access point name information. In one embodiment, the generating of the wireless provisioning message includes providing a mobile carrier code in the additional access point name information. In one embodiment, the generating of the wireless provisioning message includes providing a user name and password in the additional access point name information.

Referring to FIG. 2, the APN information 125 can be stored in an elementary file of the UICC 120. For example, the elementary file can provide a set of configuration parameters for USIM based APN provisioning records. For instance, the elementary file can contain an activity flag and BER-TLV coded file APN provisioning data. This data can then be made available to a device processor (separate from the UICC processor) of the wireless device 116 to provision static APN records when registered on a given network.

Referring to FIG. 3, an APN Validity Flag can be utilized which is a bit coded Byte with the following Coding:

Bit 8 (MSB) = 0, TLV data valid

= 1, TLV data invalid, file content should be discarded

Bit 7-1 (data) = hex coded decimal count of APN records defined within file

Example:
Byte 1: FF→File content irrelevant, invalidated
Byte 1: 0C→File Active, 12 APN records expected within EF Referring to FIG. 4, Bytes 2-n can be COMPREHENSION-TLV coded objects where data body tag: "A0"—other TAGs Reserved for Future Use; data body length: hex coded length of "data Value"; and data body value: COMPREHENSION-TLV data set. The body of the data can be wrapped in one complete BER-TLV object. In one embodiment, individual APN records can be stored sequentially within the body in individual TLVs.

Referring to FIG. 5, APN objects can be described by tags, such as those listed as in Table 500. As an example, sequential APN records can be independent and unrelated such that each APN record can consist of a unique set of parameters and are not dependent on previously defined APN records. In one embodiment, unused tags may be omitted. Content for omitted tags can assume a NULL value. The byte "FF" can be reserved for file termination and/or read error. In the event the device processor of the wireless device 116 reads a byte of "FF", the device processor can terminate the read of the file and disregard additional data within the file (e.g., any data following a byte of "FF" can be considered invalid). This will provide for a non-provisioned APN file (defaulting to "FF" data blocks) and certain terminals that return "FF" upon incorrect file data read, invalid access condition, and so forth.

Referring to FIG. 6, an example of APN information 125 that is to be stored in UICC 120 where there is an operator configuration utilizing three APN records. The coding would be as follows:

Byte 1:
File is active and includes 3 records. Byte1="03"
Bytes 2-n:

| | |
|---|---|
| A0 | Tag "A0" |
| 00 9A | 0x009A bytes of data body |
| 80 01 01 | Index: 01 |
| 81 07 64 65 66 61 75 6c 74 | Name: default |
| 82 14 64 65 66 61 75 6c 74 2e 6f 70 65 72 61 74 6f 72 2e 63 6f 6d | default.operator.com |
| 83 03 33 31 30 | 310 |
| 84 03 38 37 36 | 876 |
| 85 01 01 | 01 |
| 80 01 02 | Index: 02 |
| 81 09 62 72 6f 61 64 62 61 6e 64 | broadband |
| 82 09 62 72 6f 61 64 62 61 6e 64 | broadband |
| 83 03 33 31 30 | 310 |
| 84 03 38 37 36 | 876 |
| 85 01 01 | 01 |
| 89 06 6d 79 75 73 65 72 | myuser |
| 8A 06 6d 79 70 61 73 73 | mypass |
| 80 01 03 | Index: 03 |
| 81 0c 49 6e 66 6f 74 61 69 6e 6d 65 6e 74 | Name: Infotainment |
| 82 06 6e 65 77 61 70 6e | newapn |
| 83 03 33 31 30 | 310 |
| 84 03 38 37 36 | 876 |
| 89 07 6e 65 77 75 73 65 72 | newuser |
| 8A 07 6e 65 77 70 61 73 73 | newpass |

Figure 7:
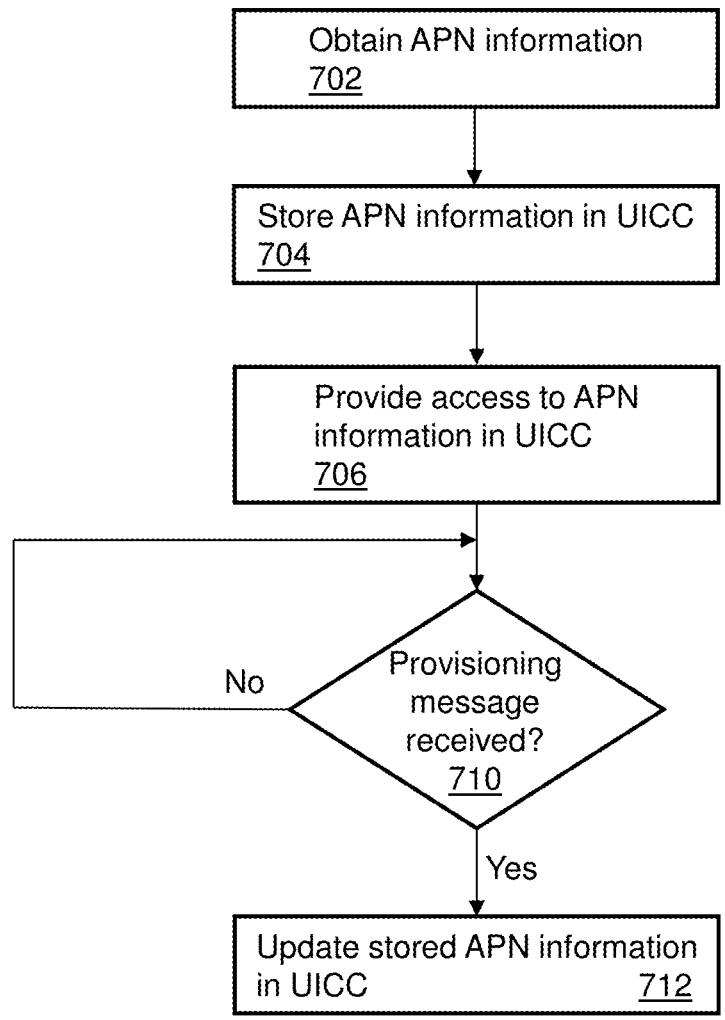
FIG. 7 depicts an illustrative embodiment of a method used in portions of the system described in FIG. 1.

This would result in a transparent file content of:
A0 00 9A 80 01 81 07 64 65 66 61 75 6c 74 82 14 64 65 66 61 75 6c 74 2e 6f 70 65 72 61 74 6f 72 2e 63 6f 6d 83 03 33 31 30 84 03 38 37 36 85 01 01 80 02 81 09 62 72 6f 61 64 62 61 6e 64 82 09 62 72 6f 61 64 62 61 6e 64 83 03 33 31 30 84 03 38 37 36 85 01 01 89 06 6d 79 75 73 65 72 8A 06 6d 79 70 61 73 73 80 03 81 0c 49 6e 66 6f 74 61 69 6e 6d 65 6e 74 82 06 6e 65 77 61 70 6e 83 03 33 31 30 84 03 38 37 36 89 07 6e 65 77 75 73 65 72 8A 07 6e 65 77 70 61 73 73 ff . . . ff FIG. 7 depicts an illustrative embodiment of a method used by system 100 for management of APN information. At 702, APN information can be obtained and at 704 the APN information can be stored in a UICC. As an example, the UICC can be provisioned with the APN information and then the UICC can be provided for use with the particular wireless device. In another embodiment, the UICC can be coupled with the wireless device and can then receive the APN information, such as from a memory of the device processor and/or via an OTA provisioning message.

At 706, the UICC can provide the device processor of the wireless device with access to the APN information. For instance, responsive to a booting procedure by the device processor, the device processor can read the APN information from the UICC memory and store it in a cache memory of the device processor for use during wireless communications.

At 710, a wireless provisioning message can be received from a provisioning server, where the wireless provisioning message includes additional access point name information associated with one or more APN's. In one embodiment, the wireless provisioning message can be associated with a batch update that is directed to a group of communication devices, where at least some of the group of communication devices utilize different types of radio access modules, and where the additional access point name information is independent of (and not configured based on) the different types of radio access module. At 712, the UICC can update the stored data based on the additional APN information to generate updated APN information and can store, in the UICC memory, the updated APN information.

While for purposes of simplicity of explanation, the respective processes are shown and described as a series of blocks in FIG. 7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 8:
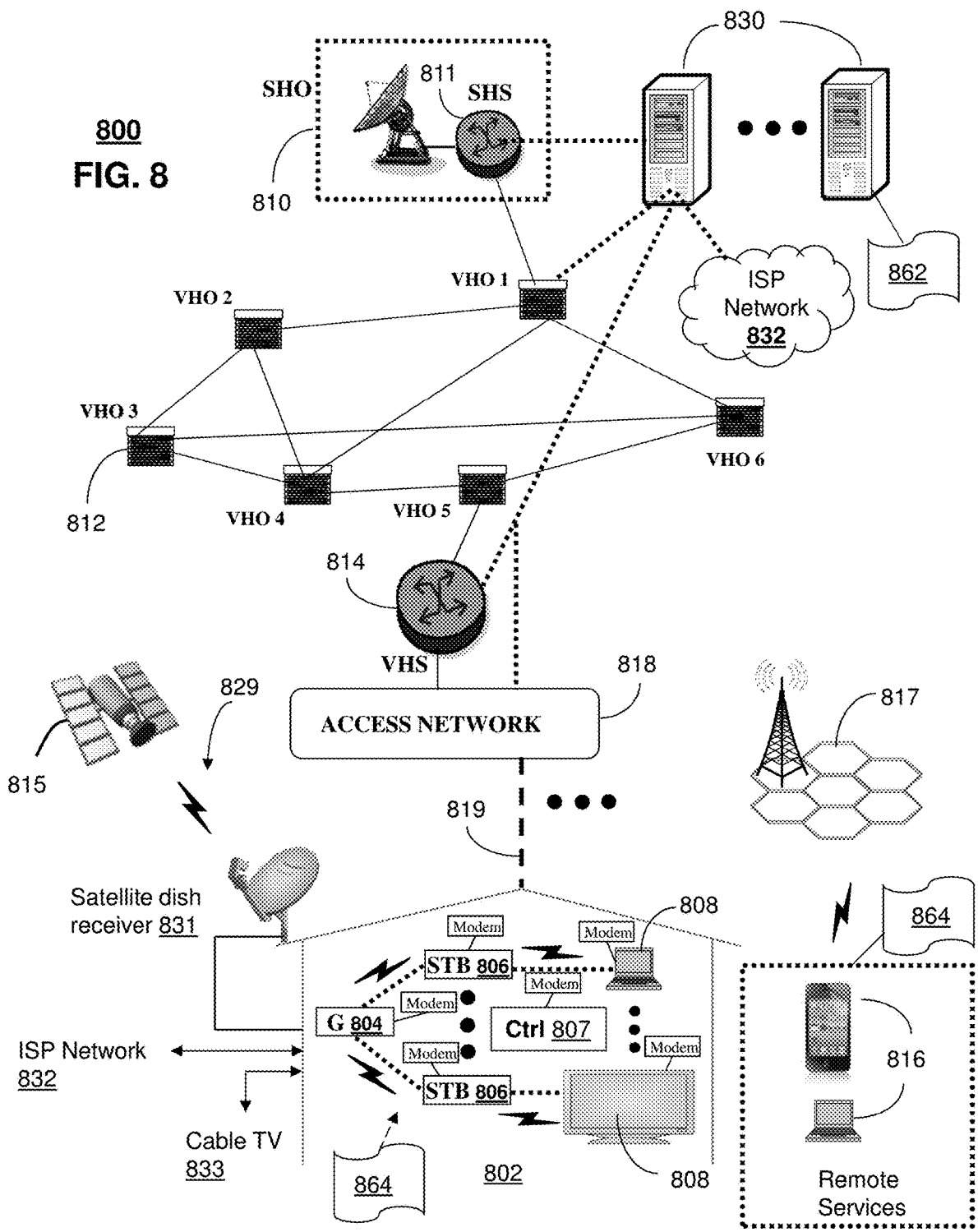
FIG. 8 depicts an illustrative embodiment of a communication system that provides communication services including batch APN information updating.

FIG. 8 depicts an illustrative embodiment of a communication system 800 for providing communication services that can include delivering media content, as well as other services such as M2M communications, IoT communications, and so forth. The communication system 800 can include an Interactive Television system. Communication system 800 can be overlaid or operably coupled with system 100 of FIG. 1 as another representative embodiment of communication system 800. For instance, one or more devices illustrated in the communication system 800 of FIG. 8 can manage APN information via storage in a UICC memory and/or can receive OTA provisioning message(s) to update the stored APN information. System 800 can include one or more communication devices that include a modem or radio access module with the ability to be provisioned with and/or to store APN information in a UICC of the communication device.

In one embodiment, an IPTV media system is provided that can include a super head-end office (SHO) 810 with at least one super headend office server (SHS) 811 which receives media content from satellite and/or terrestrial communication systems. In the present context, media content can represent, for example, audio content, moving image content such as 2D or 3D videos, video games, virtual reality content, still image content, and combinations thereof. The SHS server 811 can forward packets associated with the media content to one or more video head-end servers (VHS) 814 via a network of video head-end offices (VHO) 812 according to a multicast communication protocol.

The VHS 814 can distribute multimedia broadcast content via an access network 818 to commercial and/or residential buildings 802 housing a gateway 804 (such as a residential or commercial gateway). The access network 818 can represent a group of digital subscriber line access multiplexers (DSLAMs) located in a central office or a service area interface that provide broadband services over fiber optical links or copper twisted pairs 819 to buildings 802. The gateway 804 can use communication technology to distribute broadcast signals to media processors 806 such as Set-Top Boxes (STBs) which in turn present broadcast channels to media devices 808 such as computers or television sets managed in some instances by a media controller 807 (such as an infrared or RF remote controller). In one embodiment, the gateway 804, the media processors 806, the media controller 807, and/or the media device 808 (e.g., a smart television) can include a modem or radio access module with the ability to be provisioned with and/or to store APN information in a UICC for facilitating wireless communications over a wireless network.

The gateway 804, the media processors 806, and media devices 808 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 806 and subsystems of the IPTV media system for services such as video-on-demand (VoD), browsing an electronic programming guide (EPG), or other infrastructure services.

A satellite broadcast television system 829 can be used in the media system of FIG. 8. The satellite broadcast television system can be overlaid, operably coupled with, or replace the IPTV system as another representative embodiment of communication system 800. In this embodiment, signals transmitted by a satellite 815 that include media content can be received by a satellite dish receiver 831 coupled to the building 802. Modulated signals received by the satellite dish receiver 831 can be transferred to the media processors 806 for demodulating, decoding, encoding, and/or distributing broadcast channels to the media devices 808. The media processors 806 can be equipped with a broadband port to an Internet Service Provider (ISP) network 832 to enable interactive services such as VoD and EPG as described above.

In yet another embodiment, an analog or digital cable broadcast distribution system such as cable TV system 833 can be overlaid, operably coupled with, or replace the IPTV system and/or the satellite TV system as another representative embodiment of communication system 800. In this embodiment, the cable TV system 833 can also provide Internet, telephony, and interactive media services. System 800 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 830, a portion of which can operate as a web server for providing web portal services over the ISP network 832 to wireline media devices 808 or wireless communication devices 816.

Communication system 800 can also provide for all or a portion of the computing devices 830 to function as a provisioning server (herein referred to as server 830). The server 830 can use computing and communication technology to perform function 862, which can include among other things, the batch updating techniques described by method 700 of FIG. 7. For instance, function 862 of server 830 can be similar to the functions described for server 130 of FIG. 1, including receiving a request for a batch update associated with an APN, the batch update being associated with a group of communication devices; generating a wireless provisioning message that includes additional APN information, wherein the additional APN information is independent of a type of radio access module being utilized by each of the group of communication devices; and providing the wireless provisioning message to the group of communication devices, where the providing of the wireless provisioning message enables the group of communication devices to update APN information stored in UICC's of each of the group of communication devices based on the additional APN information to generate updated APN information.

The gateway 804, media processors 806, the media controller 807, the media devices 808, and/or the wireless communication devices 816 can include a modem or radio access module and can be provisioned with software functions 864 to utilize the services of server 830. For instance, functions 864 can be similar to the functions described for the wireless device 116 of FIG. 1, including storing, in the UICC memory, APN information associated with one or more APN's to be utilized by the device processor for wireless communications; receiving a wireless provisioning message via the device processor, where the wireless provisioning message includes additional APN information, where the wireless provisioning message is directed to a group of communication devices, where at least some of the group of communication devices utilize different types of radio access modules, and where the additional APN information is not configured based on the different types of radio access module; updating the APN information based on the additional APN information to generate an updated APN information; and storing, in the UICC memory, the updated APN information.

Multiple forms of media services can be offered to media devices over landline technologies such as those described above. Additionally, media services can be offered to media devices by way of a wireless access base station 817 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

In one or more embodiments, system 800 can employ an IP Multimedia Subsystem (IMS) network architecture to facilitate the combined services of circuit-switched and packet-switched systems.

Figure 9:
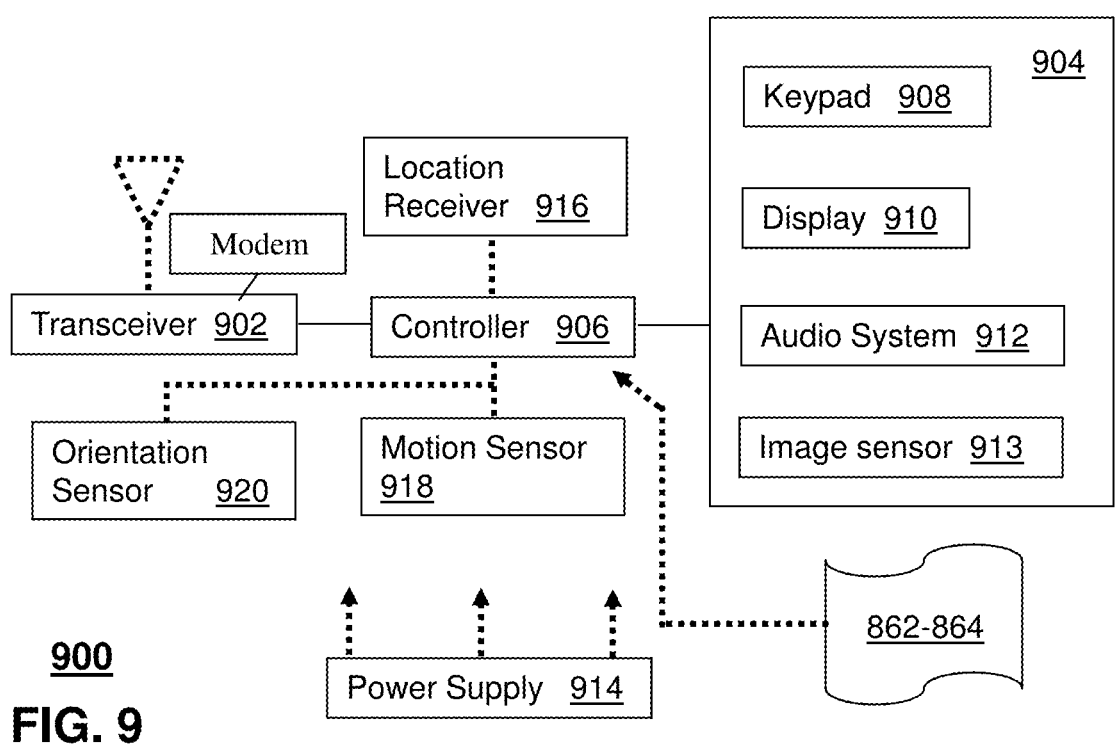
FIG. 9 depicts an illustrative embodiment of a communication device.

FIG. 9 depicts an illustrative embodiment of a communication device 900. Communication device 900 can serve in whole or in part as an illustrative embodiment of the devices depicted in FIG. 1 and FIG. 8 and can be configured to perform portions of method 700 of FIG. 7. Device 900 can be various types of devices including IoT devices, M2M devices, and so forth, which may or may not be an end user device. Device 900 can include a modem or radio access module with a UICC for receiving and storing APN information. Device 900 can facilitate the management of APN information by enabling storing (on a UICC) of APN information associated with one or more APN's and/or enabling OTA provisioning of the stored APN information.

Communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/

GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth®. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 900.

Other components not shown in FIG. 9 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 900 can also include a slot for adding or removing an identity module such as a SIM card. SIM cards can be used for identifying subscriber services, executing programs, storing subscriber data, and so forth.

The communication device 900 as described herein can operate with more or less of the circuit components shown in FIG. 9. These variant embodiments can be used in one or more embodiments of the subject disclosure.

The communication device 900 can be adapted to perform the functions of devices of FIG. 1, the media processor 806, the media devices 808, or the wireless communication devices 816 of FIG. 8. It will be appreciated that the communication device 900 can also represent other devices that can operate in the system of FIG. 1, communication system 800 of FIG. 8 such as a gaming console and a media player. In addition, the controller 906 can be adapted in various embodiments to perform the functions 862-864, respectively.

Upon reviewing the aforementioned embodiments, it would be evident to an artisan with ordinary skill in the art that said embodiments can be modified, reduced, or enhanced without departing from the scope of the claims described below. For example, provisioning of a replacement UICC can be performed so that the APN information is transferred from the old UICC to the new UICC. For instance, the UICC memory or a portion thereof (e.g., the APN information) can be transmitted to a network server and then can be retrieved from the network server when the new UICC is detected. Other techniques can also be utilized to facilitate the transfer of the APN information, such as storing default APN information in a device processor memory to enable the device processor to establish a wireless communication session with the network server upon detecting the new UICC. In one embodiment, the wireless device can be configured to not have an integrated user interface. As an example, the wireless device can be part of a vehicle communication system which may enable user input via a removable hardwire connection to the wireless device or may not enable any direct user inputs (e.g., all inputs are via received wireless signals). In another embodiment, the batch provisioning of the APN information can be performed in a decentralized fashion. As an example, a provisioning server can transmit the APN information to a first group of wireless devices (e.g., located at different facilities) and the first group of devices can in turn transmit the APN information to a second group of devices (e.g., smaller groups within each of the facilities). Authentication or other security measures can be taken to ensure that the APN information is being properly shared with authorized wireless devices. This decentralized propagation of the APN information can be applied to any number of groups of devices where each of the groups of devices may be related (e.g., in proximity to each other or associated with a single business entity) or may be unrelated. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 10:
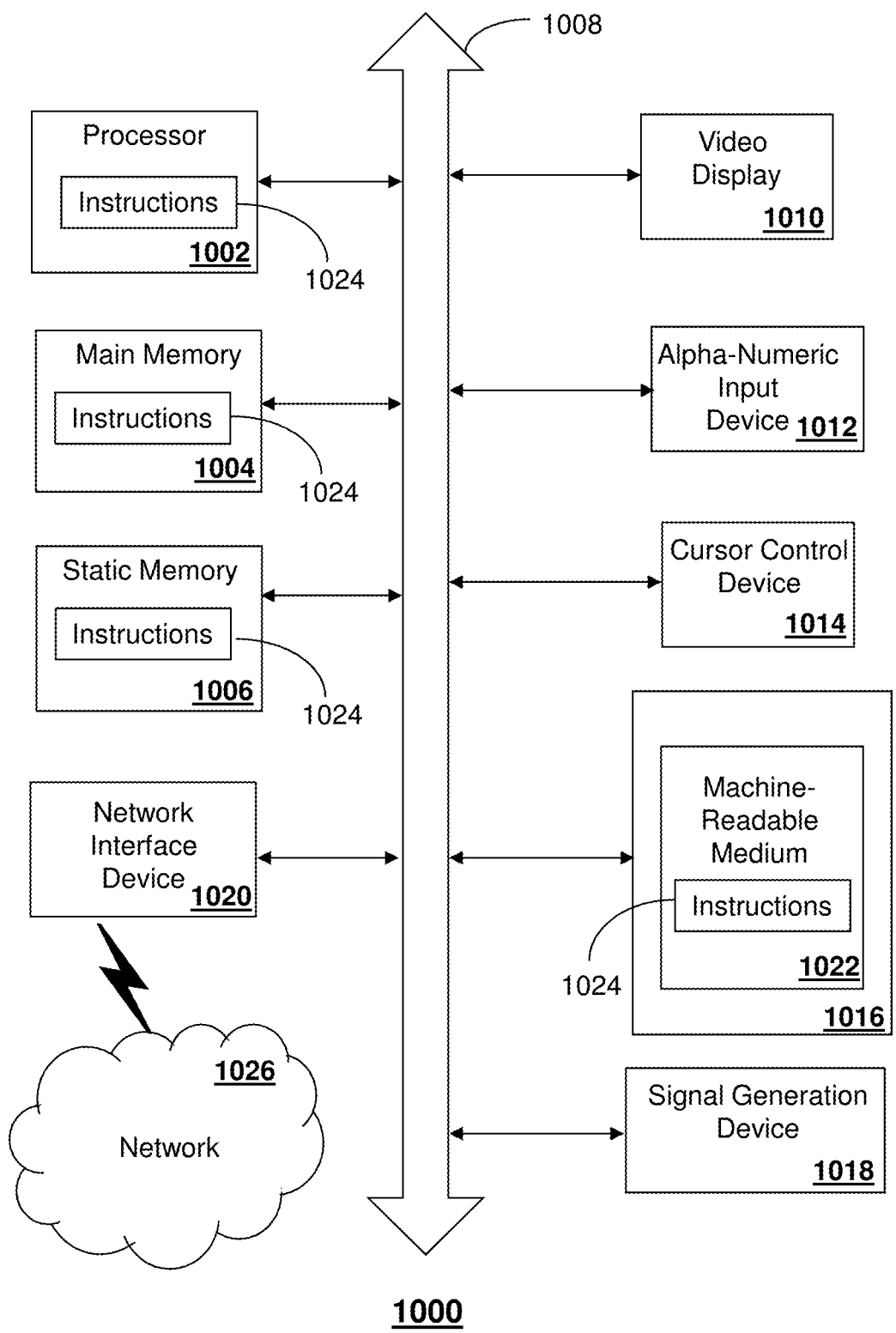
FIG. 10 is a diagrammatic representation of a machine in the form of a computer system within which a set of instructions, when executed, may cause the machine to perform any one or more of the methods described herein.

FIG. 10 depicts an exemplary diagrammatic representation of a machine in the form of a computer system 1000 within which a set of instructions, when executed, may cause the machine to perform any one or more of the methods described above. One or more instances of the machine can operate, for example, as the device 116, the server 130, the server 830, the media processor 806, the wireless device 816 and other devices of FIGS. 1 and 8 to enable management of APN information utilizing a UICC. In some embodiments, the machine may be connected (e.g., using a network 1026) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU)), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1022 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1000. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:

providing, by a Universal Integrated Circuit Card (UICC) including a processing system, default access point name information to a wireless communication device responsive to a booting procedure at the wireless communication device;

receiving, by the UICC, from the wireless communication device, provisioned access point name information associated with an access point name, wherein the provisioned access point name information is further received at the wireless communication device via a wireless provisioning message transmitted by a server via wireless communications, and wherein the server does not adjust the provisioned access point name information based upon a type of radio access module utilized by the wireless communication device; and storing, by the UICC, the provisioned access point name information in a memory, wherein subsequent wireless communications by the wireless communication device utilize the provisioned access point name information stored in the UICC.

2. The method of claim 1, wherein the wireless communication device detects a connection of the wireless communication device to the UICC.

3. The method of claim 2, wherein the wireless communication device receives the provisioned access point name information from the server responsive to the wireless communication device detecting the connection of the wireless communication device to the UICC.

4. The method of claim 2, wherein a second UICC is removed from the wireless communication device, and wherein the wireless communication device detects the connection of the wireless communication device to the UICC by detecting removal of the second UICC from the wireless communication device.

5. The method of claim 1, wherein the provisioned access point name information of the wireless provisioning message is associated with a plurality of access point names.

6. The method of claim 5, wherein a second access point name of the plurality of access point names is utilized by the processing system according to a type of data to be communicated.

7. The method of claim 1, wherein the provisioned access point name information comprises network identification information.

8. The method of claim 1, wherein the provisioned access point name information includes a mobile country code, a mobile carrier code, or a combination thereof.

9. The method of claim 1, wherein the provisioned access point name information includes a user name and a password.

10. The method of claim 1, wherein the provisioned access point name information is utilized by the wireless communication device during a second booting procedure of the wireless communication device.

11. A Universal Integrated Circuit Card (UICC), comprising:

a processing system including a processor; and a memory that stores executable instructions that, when executed by the processing system, facilitate performance of operations, comprising:

providing default access point name information to a wireless communication device responsive to a booting procedure at the wireless communication device;

receiving from the wireless communication device, provisioned access point name information associated with an access point name, wherein the provisioned access point name information is further received at the wireless communication device via a wireless provisioning message transmitted by a server via wireless communications; and storing the provisioned access point name information in the memory, wherein subsequent wireless communications by the wireless communication device utilize the provisioned access point name information stored in the UICC.

12. The Universal Integrated Circuit Card of claim 11, wherein the server does not adjust the provisioned access point name information based upon a type of radio access module utilized by the wireless communication device.

13. The Universal Integrated Circuit Card of claim 11, wherein the wireless communication device detects a connection of the wireless communication device to the UICC, and wherein the wireless communication device receives the provisioned access point name information from the server responsive to the wireless communication device detecting the connection of the wireless communication device to the UICC.

14. The Universal Integrated Circuit Card of claim 11, wherein the wireless communication device detects a connection of the wireless communication device to the UICC, and wherein a second UICC is removed from the wireless communication device, and wherein the wireless communication device detects the connection of the wireless communication device to the UICC by detecting removal of the second UICC from the wireless communication device.

15. The Universal Integrated Circuit Card of claim 11, wherein the provisioned access point name information of the wireless provisioning message is associated with a plurality of access point names, and wherein a second access point name of the plurality of access point names is utilized by the processing system according to a type of data to be communicated.

16. The Universal Integrated Circuit Card of claim 11, wherein the wireless communication device does not have a direct user interface.

17. The Universal Integrated Circuit Card of claim 11, wherein the wireless communication device is part of a communication system of a vehicle.

18. The Universal Integrated Circuit Card of claim 11, wherein the provisioned access point name information is utilized by the wireless communication device during a second booting procedure of the wireless communication device.

19. A machine-readable storage medium, comprising executable instructions that, when executed by a processing system including a processor of a Universal Integrated Circuit Card (UICC), facilitate performance of operations, comprising:

providing default access point name information to a wireless communication device responsive to a booting procedure at the wireless communication device;

receiving from the wireless communication device, provisioned access point name information associated with an access point name; and storing the provisioned access point name information in a memory, wherein subsequent wireless communications by the wireless communication device utilize the provisioned access point name information stored in the UICC.

20. The machine-readable storage medium of claim 19, wherein the provisioned access point name information is further received at the wireless communication device via a wireless provisioning message transmitted by a server via wireless communications.

\* \* \* \* \*